(12) United States Patent
Patra (10) Patent No.: US 12,034,553 B2
(45) Date of Patent: Jul. 9, 2024

(54) CONTENT VIEWING GUIDANCE IN AN ONLINE MEETING

(71) Applicant: International Business Machines Corporation, Armonk, NY (US)

(72) Inventor: Suman Patra, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/658,874

(22) Filed: Apr. 12, 2022

(65) Prior Publication Data

US 2023/0327895 A1 Oct. 12, 2023

(51) Int. Cl.
| | |
|---|---|
| *H04L 12/18* | (2006.01) |
| *G06F 3/16* | (2006.01) |
| *G06F 9/451* | (2018.01) |
| *G10L 15/22* | (2006.01) |

(52) U.S. Cl.
CPC .......... *H04L 12/1822* (2013.01); *G06F 3/167* (2013.01); *G06F 9/453* (2018.02); *G10L 15/22* (2013.01); *G10L 2015/223* (2013.01)

(58) Field of Classification Search
CPC ..... H04L 12/1822; G06F 9/453; G06F 3/167; G10L 15/22; G10L 2015/223
See application file for complete search history.

(56) References Cited

U.S. PATENT DOCUMENTS

| | | |
|---|---|---|
| 8,107,401 B2 | 1/2012 | John et al. |
| 8,749,587 B2 | 6/2014 | Chiu et al. |
| 10,540,971 B2 | 1/2020 | Kumar |
| 11,489,895 B1* | 11/2022 | Fardig ..................... G10L 15/22 |
| 2011/0205147 A1* | 8/2011 | Wilson ..................... G06F 3/017 |
| | | 704/275 |
| 2013/0073965 A1* | 3/2013 | Sik ......................... G06F 3/1462 |
| | | 715/730 |
| 2016/0170617 A1 | 6/2016 | Shi et al. |

(Continued)

FOREIGN PATENT DOCUMENTS

KR 100815121 B1 3/2008

OTHER PUBLICATIONS

Anonymous,"Systems and Methods for Collaborative Conference Smarter Content Viewing Guidance," an IP.com Prior Art Database Technical Disclosure, IP.com No. IPCOM000267816D, Nov. 28, 2021, 3 pgs.

(Continued)

*Primary Examiner* — Sherrod L Keaton
(74) *Attorney, Agent, or Firm* — Kimberly Zillig (57) ABSTRACT

A system including at least one interface configured to receive data from and transmit data to a first computing device of a plurality of computing devices involved in a virtual online meeting through an external application, and a processor communicatively coupled to the at least one interface. The processor is configured to receive, via the at least one interface, a request from the first computing device of the plurality of computing devices via a voice command of the request to change a display of a shared content of the virtual online meeting on the first computing device, and output instructions to a virtual assistant that is communicatively coupled to the first computing device to change the display of the shared content on the first computing device.

13 Claims, 5 Drawing Sheets

(56) References Cited

U.S. PATENT DOCUMENTS

2021/0249009 A1* 8/2021 Manjunath ............ H04N 7/157
2023/0055606 A1* 2/2023 Kumar .................... H04L 63/08

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

Sample Pages, "Video Conferencing Market Size By Component (Hardware [Multipoint Control Unit (MCU), Codecs, Peripheral Devices], Software [On-Premise, Cloud], Service [Professional, Managed]), By Type (Room-Based, Telepresence, Desktop), By Application (Corporate Enterprise, Education, Government, Healthcare), COVID-19 Impact Analysis, Regional Outlook, Growth Potential, Competitive Market Share & Forecast, 2021-2027," Oct. 2021, 66 pages. https://www.gminsights.com/industry-analysis/video-conferencing-market.

Sevilla, G. (2019) "Get Ready: Voice Assistants Are Coming to Your Conference Room," https://in.pcmag.com/microsoft-office-365-business-premium/129886/get-ready-voice-assistants-are-coming-to-your-conference-room, PCMag India, Microsoft Office 365 Business Premium, Dec. 2, 2021, 8 pgs.

* cited by examiner

CONTENT VIEWING GUIDANCE IN AN ONLINE MEETING

BACKGROUND

The present disclosure relates generally to viewing content on computing devices during an online meeting, and more particularly to a system and process for invoking a virtual assistant that can carry out tasks that assist an end user in more efficient collaboration in the online meeting.

With dramatic advances in communication technologies, the advent of new techniques and functions in portable computing devices has steadily aroused consumer interest. In addition, various approaches to online meeting sharing technology through user-interfaces have been introduced in the field of portable computing devices.

SUMMARY

According to some embodiments of the disclosure, there is provided a system including at least one interface configured to receive data from and transmit data to a first computing device of a plurality of computing devices involved in a virtual online meeting through an external application, and a processor communicatively coupled to the at least one interface. The processor is configured to receive, via the at least one interface, a request from the first computing device of the plurality of computing devices via a voice command of the request to change a display of a shared content of the virtual online meeting on the first computing device, and output instructions to a virtual assistant that is communicatively coupled to the first computing device to change the display of the shared content on the first computing device.

According to some embodiments of the disclosure, there is provided a computer-implemented method. The method includes an operation of displaying shared content from a virtual online meeting through an external application on a screen of a first computing device of a plurality of computing devices. Another operation is receiving a voice command from the first computing device to change a display of the shared content on the screen of the first computing device. A further operation is invoking a virtual assistant to change the display of the shared content on the first computing device as requested in the voice command.

According to some embodiments of the disclosure, there is provided a method including a first operation of a first user joining a virtual online meeting through an external application from a first computing device. Another operation is the first user opting into a virtual assistant software module from the first computing device. A further operation is collecting information from the first user. Next is another operation of displaying shared content from the virtual online meeting on a screen of the first computing device. Further operations are receiving a voice command from the first computing device to change a display of the shared content on the screen of the first computing device, and invoking a virtual assistant to change the display of the shared content on the first computing device as requested in the voice command.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to viewing content on computing devices during an online meeting, and more particularly to a system and process for invoking a virtual assistant that can carry out tasks that assist an end user in more efficient collaboration in the online meeting. While the present disclosure is not necessarily limited to such applications, various aspects of the disclosure can be appreciated through a discussion of various examples using this context.

Many computing devices employ online meeting technology for sharing content on a display element (or screen) of a computing device. Often, online meeting technology allows a host (presenter) to share content on his or her computing device with users (attendees or participants) through a wireless connection. The content is shared, but may not be viewed similarly on all computing devices being used by the users. The users can struggle to view the shared content properly, for example, when the users join using a portable computing device with a small screen (e.g., a smart phone). Although a portable computing device (e.g., smart phone, an e-book reader, personal data assistant, or tablet computer) is shown, it should be understood that various other types of electronic devices capable of processing input can be used in accordance with various embodiments disclosed herein. It often requires the user to manually zoom in on or zoom out from a relevant portion of the shared content, in order to view the shared content more clearly on the portable computing device, because the portable computing device may not have enough display area to show all of the shared content in one screen and make the shared content readable by the user. Manually zooming in or out as the meeting progresses can be cumbersome to the user and it can hamper the user's concentration on the meeting. Thus, there is a need for a system and process to allow users of such portable computing devices to, for example, more easily and automatically zoom in and out of selective portions of the shared content of the online meeting.

The shared content in an active or selective region can be zoomed in (magnified) to appear enlarged on a screen of the computing device. In this instance, the shared content can be magnified. The shared content in the active region can also be zoomed-out (compressed), such that the shared content will appear smaller than the original size of the content.

Disclosed, in some embodiments, is a system and method of invoking a virtual assistant based on interaction via voice in an online meeting. The virtual assistant can carry out tasks that assist a user, or participant in the online meeting, in a more efficient collaboration. The virtual assistant can, for example, zoom-in on shared content on a screen of a computing device when the user is viewing the shared content from a small screen on the computing device. The user's speech and intent can be considered and an action can be taken on the small screen, for example, to zoom-in on a portion of the shared content. A conversational artificial intelligence (AI)-powered virtual assistant can execute such actions based on domain and intent classification along with the conversational AI. In the on-line meeting when all participants are muted, one user's microphone can be non-externally transmitting and spoken context actions can be limited to that user's individual screen. The user's microphone audio can be processed and not be sent to or heard by the other participants.

Turning to an overview of the technologies that are more specifically relevant to aspects of the present disclosure, conversational AI refers to technologies, like chatbots or virtual agents, which users can talk to. Such technologies use large volumes of data, machine learning, and natural language processing (NLP) to help imitate human interactions, recognizing speech and text inputs and translating their meanings across various languages.

Neural networks, also known as artificial neural networks (ANNs) or simulated neural networks (SNNs), are a subset of machine learning and are at the heart of deep learning algorithms. Their name and structure are inspired by the human brain, mimicking the way that biological neurons signal to one another. Artificial neural networks (ANNs) comprise node layers, containing an input layer, one or more hidden layers, and an output layer. Each node, or artificial neuron, connects to another and has an associated weight and threshold. If the output of any individual node is above the specified threshold value, that node is activated, sending data to the next layer of the network. Otherwise, no data is passed along to the next layer of the network.

One feature and advantage of the disclosed process and system is that when a user is viewing a virtual online meeting from a portable computing device, the user can individually zoom in on, for example, particular shared content on their device to better view the shared content. Another feature or advantage of the disclosed process and system is that the user's request to change display of the shared content on that user's device may not interrupt the host or other participants taking part in the virtual online meeting. Yet another feature or advantage of the process and system is that collaboration in the virtual online meeting can be more effective because the participants can view the shared content in a viewable format, and without interruption from requests to change the view.

Additional features and advantages of the disclosure will be set forth in the description, or can be learned by practice of the herein disclosed principles. The features and advantages of the disclosure can be realized and obtained by means of the instruments and combinations particularly pointed out in the appended claims. These and other features of the disclosure will become more fully apparent from the following disclosure and appended claims, or can be learned by the practice of the principles set forth herein.

Figure 1:
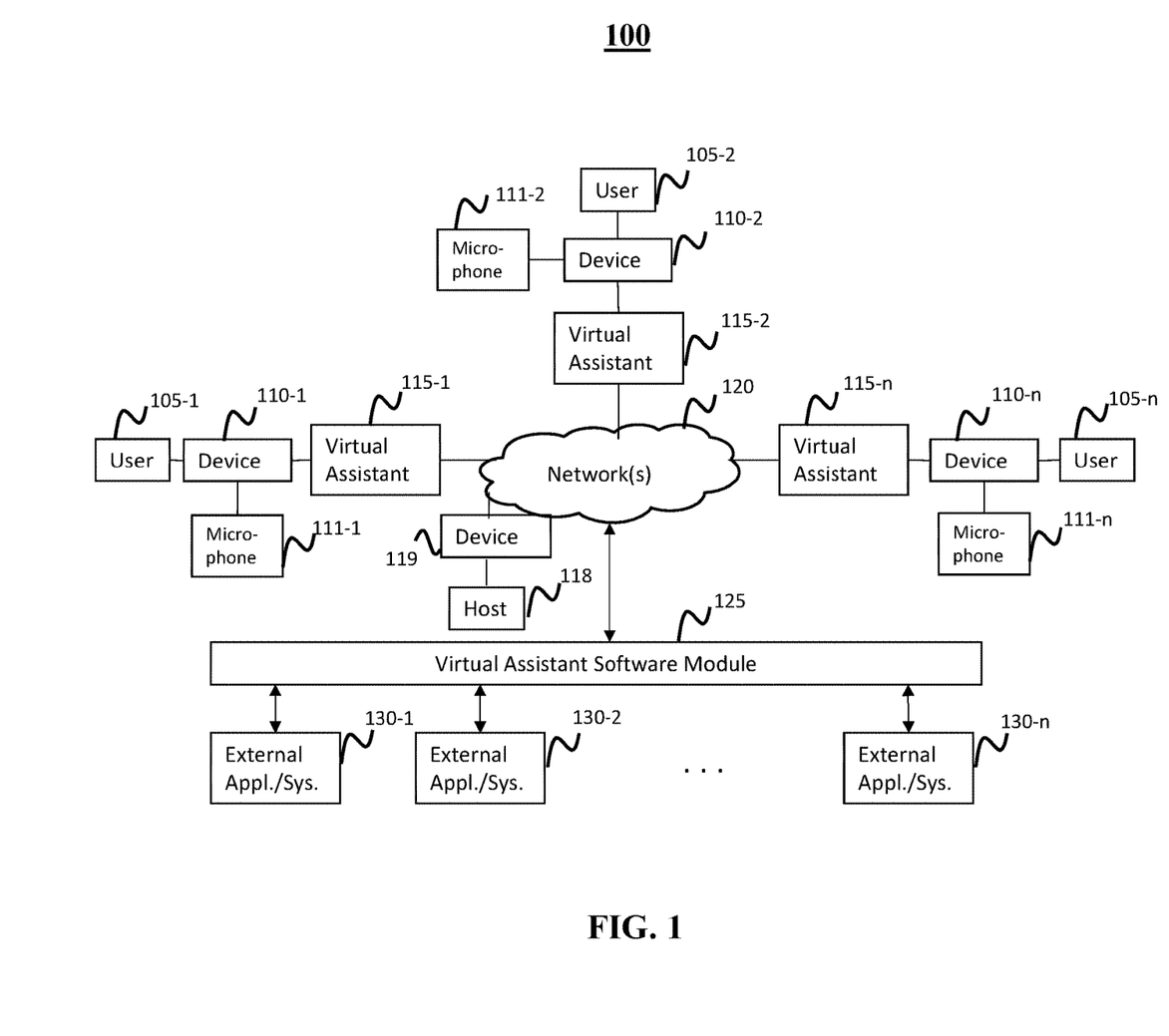
FIG. 1 illustrates a block diagram of a network environment which includes a system for content viewing guidance in an online meeting, according to some embodiments of the present disclosure.

Turning to the figures, FIG. 1 illustrates a high-level block diagram of an example network environment 100 implementing one or more of the methods, tools, and modules, and any related functions, described herein (e.g., using one or more processor circuits or computer processors of the computer), in accordance with embodiments of the present disclosure. The network environment 100 includes components of a system utilized for content viewing guidance in an online meeting, according to some embodiments of the present disclosure. As shown, one or more users 105-1 through 105-n (hereinafter, collectively referred to as users 105) each have or are associated with one or more user devices 110-1 through 110-n (hereinafter referred to as devices 110). The user devices 110 can be, for example, a personal computer, a smart phone, a tablet, or any other suitable device that can access an online meeting and include a screen for viewing content of the online meeting. The user devices 110 incorporate or have an attached microphone 111-1 through 111-n (hereinafter referred to as microphones 111) for receiving audio signals or input, such as voice commands, from the users 105. In some embodiments, the user devices 110 can include a speech or voice detection component, which can be used to recognize user speech. For example, the voice detection component can include: a speaker, a microphone, video converters, a signal transmitter and so on. The voice detection component can process a detected user voice, translate spoken words, and compare spoken words with text in shared meeting material (or content). Typical audio files can include: mp3 files, WAV files, or WMV files. It should be understood that various other types of speech recognition technologies or voice detection technologies are capable of recognizing the user's speech or voice in accordance with various embodiments discussed herein.

Each of the users 105 also has an associated virtual assistant 115-1 through 115-n (hereinafter collectively referred to as virtual assistants 115) that can be deployed or used in the context of voice communications. Functionality of the virtual assistants 115 is allocated between the virtual assistants 115 and a coupled software system, referred to as a virtual assistant software module 125, discussed below in conjunction with FIG. 2 (shown as 225). Generally, the virtual assistant software module 125 allows a developer to selectively include functionality in the virtual assistants 115 of the users 105.

As used herein, each of the virtual assistants 115 can be a software conduit that connects each of the user devices 110, such as a smart phone, to the virtual assistant software module 125. The virtual assistants 115 can allow two-way in-band signaling between the users 105 of the user devices 110 and the virtual assistant software module 125. The virtual assistant software module 125 can mediates between the virtual assistants 115 and external applications 130-1 through 130-n (hereinafter collectively referred to as external applications 130) that the virtual assistants 115 (or the user 105) interact with. The virtual assistant software module 125 interprets signals from the virtual assistants 115 and converts them into commands for the external applications 130, and the virtual assistant software module 125 can convert commands, messages and data, from the external applications 130 into signals understood by the virtual assistants 115.

There is generally a one-to-one relationship between the virtual assistants 115 and the user devices 110. Thus, the virtual assistant software module 125 can identify each of the user devices 110 and their associated user of users 105 that requests functionality from the virtual assistant software module 125 or from the external applications 130. For the sake of this discussion, it is assumed that there is a one-to-one relationship between the users 105 and user devices 110.

The plurality of users 105 are connected through a network or networks 120 to the virtual assistant software module 125. The virtual assistant software module 125 also communicates with each of the virtual assistants 115 by a data connection through the network 120. A host 118 of the online meeting can also be remotely connected to the network 120 through a computing device 119.

The virtual assistant software module 125 is a coupled software system, which is described in more detail below with regard to embodiments of the disclosure shown in subsequent figures. The virtual assistants 115 are each a software conduit that connects the user devices 105 to the virtual assistant software module 125. The network 120 can include any combination of wired or wireless data or voice public and private networks. The users 105 communicate with one another and the host 118 and take part in the online meeting with one or more of the external applications 130 over the network 120. Some examples of the external applications 130 include, for example, remote collaboration technologies such as SLACK®, WEBEX®, ZOOM®, etc. Other suitable, external applications 130 are also contemplated by the disclosure. The virtual assistant software module 125 can communicate with each of the virtual assistants 115 by means of a data connection through the network 120. The virtual assistant software module 125 mediates between the virtual assistants 115 and the external applications 130. The virtual assistant software module 125 can interpret signals from the virtual assistants 115 and convert them into commands for the external applications 130 and the virtual assistant software module 125 converts commands, messages and data, from the external applications 130 into signals understood by the virtual assistants 115.

The functionality of the virtual assistant software module 125 and the spectrum of commands available to the users 105 of the virtual assistants 115 can be aligned with the external applications 130 through customization. In other words, the virtual assistants 115 and virtual assistant software module 125 can be tailored to the functionality or subset of functionality supported by the external applications 130. The virtual assistants 115 and virtual assistant software module 125 therefore constitute a programming framework that allows the customization of commands of the virtual assistants 115 based on the selection of supported external applications 130.

Figure 2:
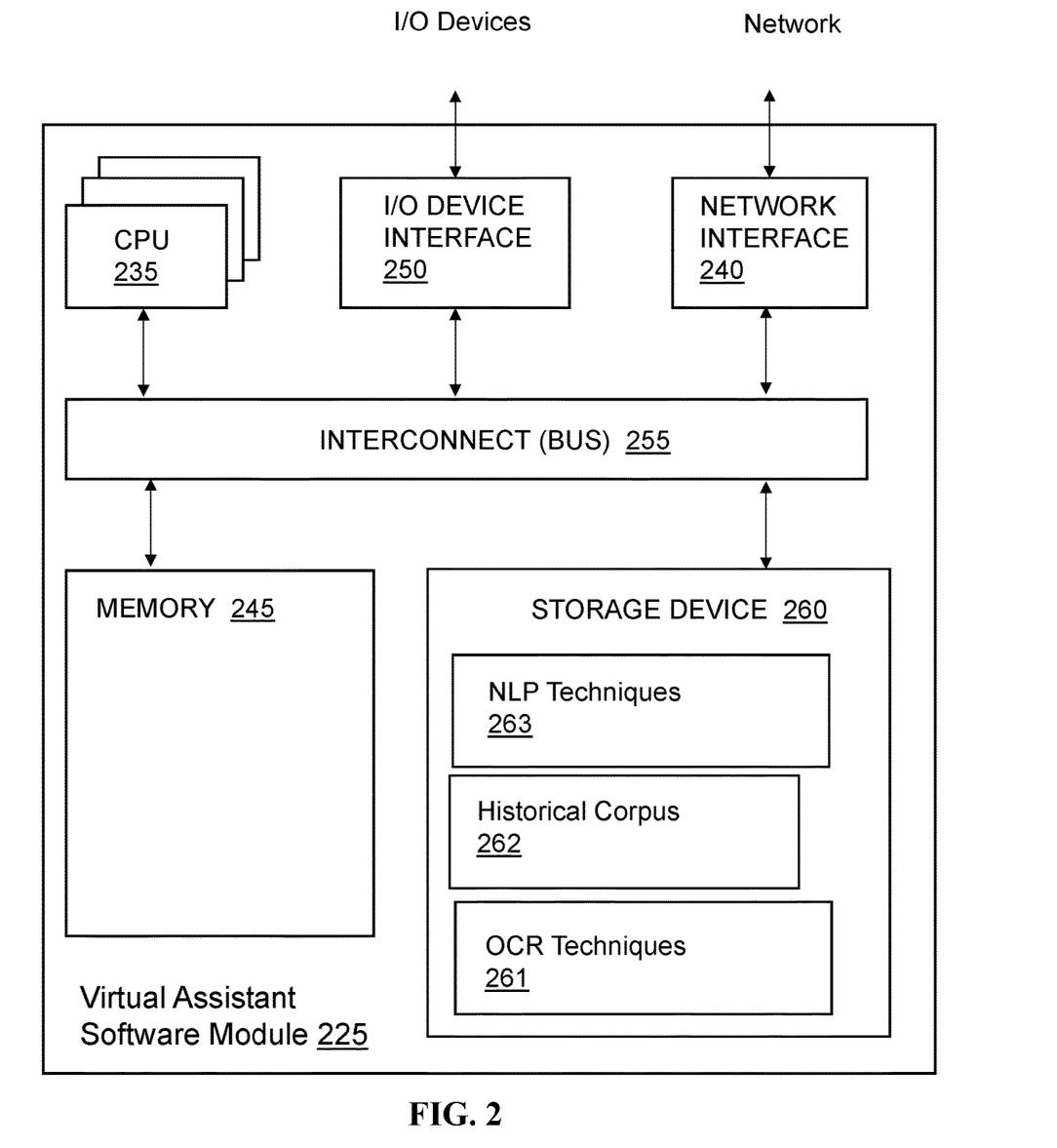
FIG. 2 is a block diagram of a virtual assistant software module, according to some embodiments of the present disclosure.

FIG. 2 is a high-level block diagram of an example virtual assistant software module 225 that can be used in implementing one or more of the methods, tools, and modules, and any related functions, described herein, in accordance with embodiments of the present disclosure. The virtual assistant software module 225 comprises a computer system that interacts with a network and Input/Output (I/O) devices. The virtual assistant software module 225 can, for example, contain one or more general purpose programmable central processing units (CPUs) 235, a network interface 240, a memory 245, an I/O interface 250, an interconnect (e.g., BUS) 255, and a storage device 260. Network interface 240 allows the virtual assistant software module 225 to connect to a network (such as 120 in FIG. 1). Each CPU 235 can execute instructions stored in the memory 245 and can include one or more levels of on-board cache. It is to be understood that the virtual assistant software module 225 is provided by way of example only and that the virtual assistant software module 225 can be implemented differently in other embodiments. For example, in other embodiments, some of the components shown in FIG. 2 can be omitted and/or other components can be included.

Each CPU 235 retrieves and executes programming instructions stored in the memory 245 and/or storage device 260. The interconnect 255 is used to move data, such as programming instructions, between the CPU 235, the I/O device interface 250, the storage device 260, the network interface 240, and the memory 245. The interconnect 255 can be implemented using one or more busses. The CPUs 235 can be a single CPU, multiple CPUs, or a single CPU having multiple processing cores in various embodiments. The memory 245 is generally included to be representative of a random access memory (RAM) (e.g., static random access memory (SRAM), dynamic random access memory (DRAM), or Flash). The storage device 260 is generally included to be representative of a non-volatile memory, such as a hard disk drive, solid state device (SSD), removable memory cards, optical storage, flash memory devices. In an alternative embodiment, the storage device 260 can be replaced by storage area-network (SAN) devices, the cloud, or other devices connected to the virtual assistant software module 225 via the I/O device interface 250 or via a communication network coupled to the network interface 240.

In some embodiments, the storage device 260 stores natural language processing (NLP) techniques 261 that can be executed by CPU 235. NLP techniques 261 can include, but are not limited to, semantic similarity, syntactic analysis, and ontological matching. A historical corpus of trigger words ("historical corpus") 262 can also be stored in the storage device 260. The historical corpus of trigger words can include words that trigger certain correlated actions to change the display of share content in the virtual online meeting. When a voice command is made, and it includes one or more of the trigger words, the correlated action on the user's computing device can be triggered. In addition, optical character recognition (OCR) techniques 263 can also be stored in the storage device 260.

A pre-set historical corpus of trigger words, such as historical corpus 262, can be prepared from the user's trained text of intent associated with a given action. Intent classification can identify a specific intent of the user within a meeting domain concept. A neural network can be used to train the virtual assistant software module 225 with expected outcomes. The virtual assistant software module 225 can index spoken content from the user prior to the online meeting. For example, if the user states "zoom into," "I can't see it properly," or "enlarge the presentation" during the online meeting, then a specific action of zooming into the shared content can occur since those words or phrases can be linked to desired, correlated actions.

Further details regarding the operation of the virtual assistant software module 225 are discussed in more detail below with respect to FIG. 3. In addition, in some embodiments, the virtual assistant software module 225 can be implemented within a cloud computer system or using one or more cloud computing services. Consistent with various embodiments, a cloud computer system can include a network-based, distributed data processing system that provides one or more cloud computing services. In certain embodiments, a cloud computer system can include many computers, hundreds or thousands of them, disposed within one or more data centers and configured to share resources over the network. However, it is to be understood that cloud computer systems are not limited to those which include hundreds or thousands of computers and can include few than hundreds of computers. Furthermore, it is to be understood that the components of the virtual assistant software module 225 can be integrated into one or more collaborative boards, such that the virtual assistant software module 225 is implemented via the computing resources of one or more collaborative boards.

In some embodiments, the virtual assistant software module 255 can be a multi-user mainframe computer system, a single-user system, or a server computer or similar device that has little or no direct user interface, but receives requests from other computer systems (clients). Further, in some embodiments, the virtual assistant software module 225 can be implemented as a desktop computer, portable computer, laptop or notebook computer, tablet computer, pocket computer, telephone, smart phone, network switches or routers, or any other appropriate type of electronic device.

It is noted that FIG. 2 is intended to depict the representative major components of an exemplary virtual assistant software module 225. In some embodiments, however, individual components may have greater or lesser complexity than as represented in FIG. 2, components other than or in addition to those shown in FIG. 2 can be present, and the number, type, and configuration of such components may vary. Furthermore, the modules are listed and described illustratively according to an embodiment and are not meant to indicate necessity of a particular module or exclusivity of other potential modules (or functions/purposes as applied to a specific module).

Figure 3:
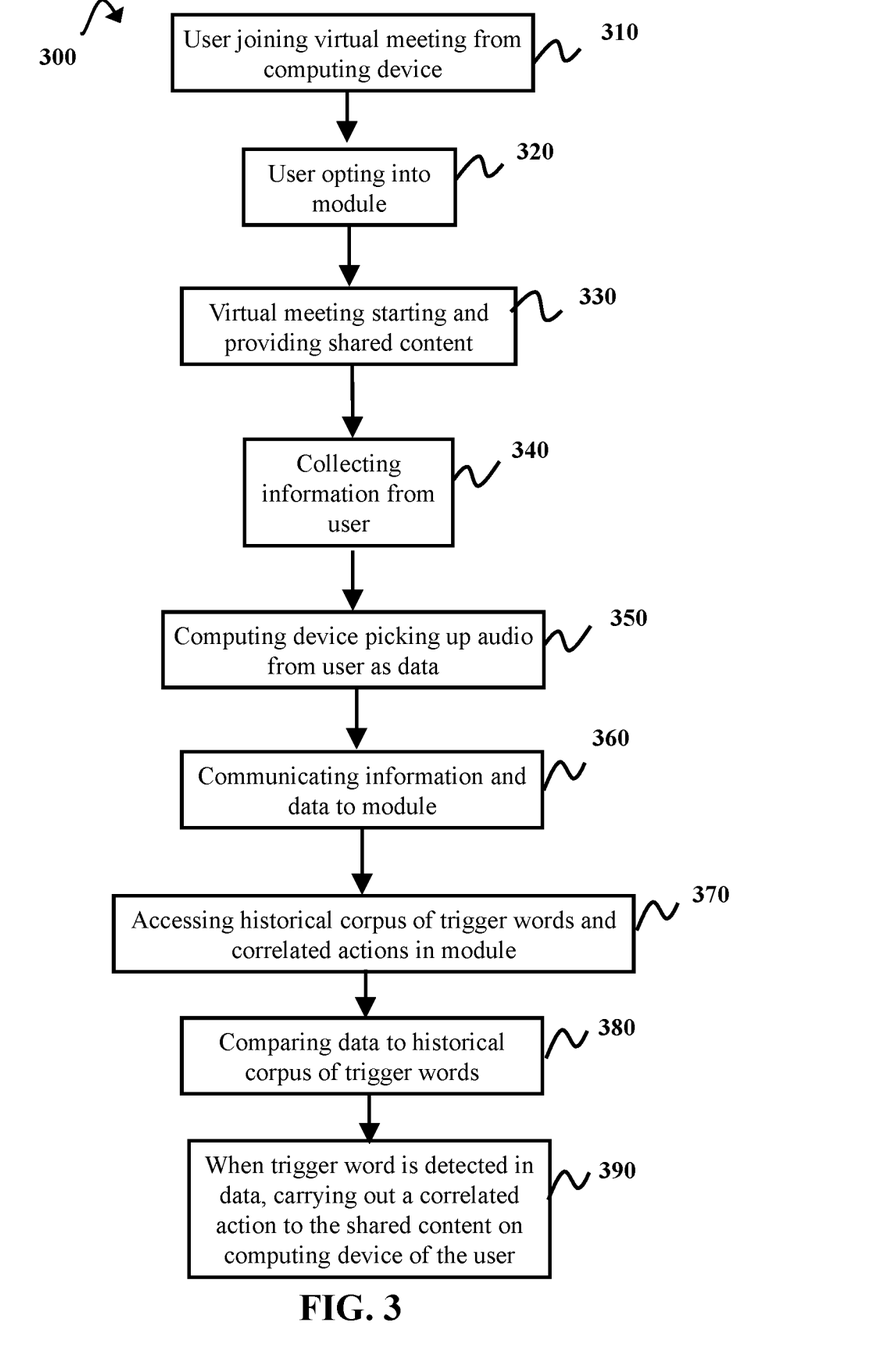
FIG. 3 is a flow diagram illustrating a process of content viewing guidance in an online meeting, according to some embodiments of the present disclosure.

FIG. 3 is a flow diagram of an example method or process 300 for content viewing guidance in a virtual online meeting. It should be understood that, for any process disclosed herein, there can be additional or alternative steps performed in similar or alternative orders, or in parallel with, within the scope of the various embodiments unless otherwise stated. In FIG. 3, an operation is provided of a user joining the virtual online meeting from a computing device, such as a portable computing device (310). The portable computing device can include at least one screen or display. A plurality of users or participants can join the virtual online meeting.

Next, in FIG. 3, is an operation of the user opting into using a virtual assistant software module from the computing device (320). The virtual assistant software module of FIG. 2 is an example embodiment of the virtual assistant software module. A host of the virtual online meeting and a meeting platform can both also opt into the virtual assistant software module. Next, in the process, is an operation of the virtual online meeting starting and providing shared content to the users or participants (330). Shared content can be any audio-visual or graphic content that can be displayed in a user interface, such as POWERPOINT® slides, EXCEL® spread sheets, web interface, or audio-visual content, etc. Often times, the user's portable computing device cannot display all the shared content in one screen pan-optically, as the portable computing device often has a small display screen.

A next operation in the process of FIG. 3 is collecting information from the user or users (340). The information collected can be used to establish a profile for each of the users. The profile can, for example, include the user's name, voice samples from the user, and preferences of the user, etc.

During the online meeting, a microphone of the computing device can be picking up audio from the user as data (350). The computing device can include at least one microphone or audio-recording device in order to pick up the audio. Also, a connection between the microphone and the virtual assistant software module is provided in order to input the audio as data. Thus, the next operation in the process is passing of the information and the data to the virtual assistant software module (360). The audio can be passed or communicated to the virtual assistant software module without being broadcast to other users or the host of the online meeting. Another operation in the process can be the virtual assistant software module identifying where the audio data is coming from, or which user is making the request.

Accessing the historical corpus of trigger words in the virtual assistant software module is a next operation in the process (370). Next, then is comparing the data to the historical corpus of trigger words (380). When a trigger word is detected, the virtual assistant software module is triggered. Detection can be performed by OCR techniques, which can be use used to extract text from presentations, for example. Another medium for detection includes NLP techniques that can be used to transform speech into text, which can be used to check if words being used by the user match words or phrases stored within the virtual assistant software module.

Once a specific word or phrase is detected, a next operation is carrying out a correlated action to the shared content on the computing device of the user (390). An example of such a correlated action can be zooming into a specific portion or multiple portions of the shared content in the online meeting on the user's computing device. Once the specific portion is magnified, then the rest of the page of the shared content outside the specific portion can be either automatically zoomed-out or can disappear from the full screen depending on the screen size and the computing device type.

Another particular embodiment of the disclosure is a computer-implemented method that will now be described by way of example and without limitation. A first operation in the computer-implemented method can be displaying shared content from a virtual online meeting through an external application on a screen of a first computing device of a plurality of computing devices. A next operation can be receiving a voice command from the first computing device to change a display of the shared content on the screen of the first computing device. A further operation can be invoking a virtual assistant to change the display of the shared content on the first computing device as requested in the voice command. The method can further include an operation of changing the display of the shared content on the first computing device to zoom in on a portion of the shared content. The voice command can be received through a microphone communicatively coupled to the first computing device. The voice command from a user of the first computing device is not externally transmitted to other computing devices of the plurality of computing devices.

In some embodiments, the data storage and retrieval processes described herein could be implemented in a cloud computing environment, which is described below with respect to FIGS. 4 and 5. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but might be able to specify location at a higher-level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
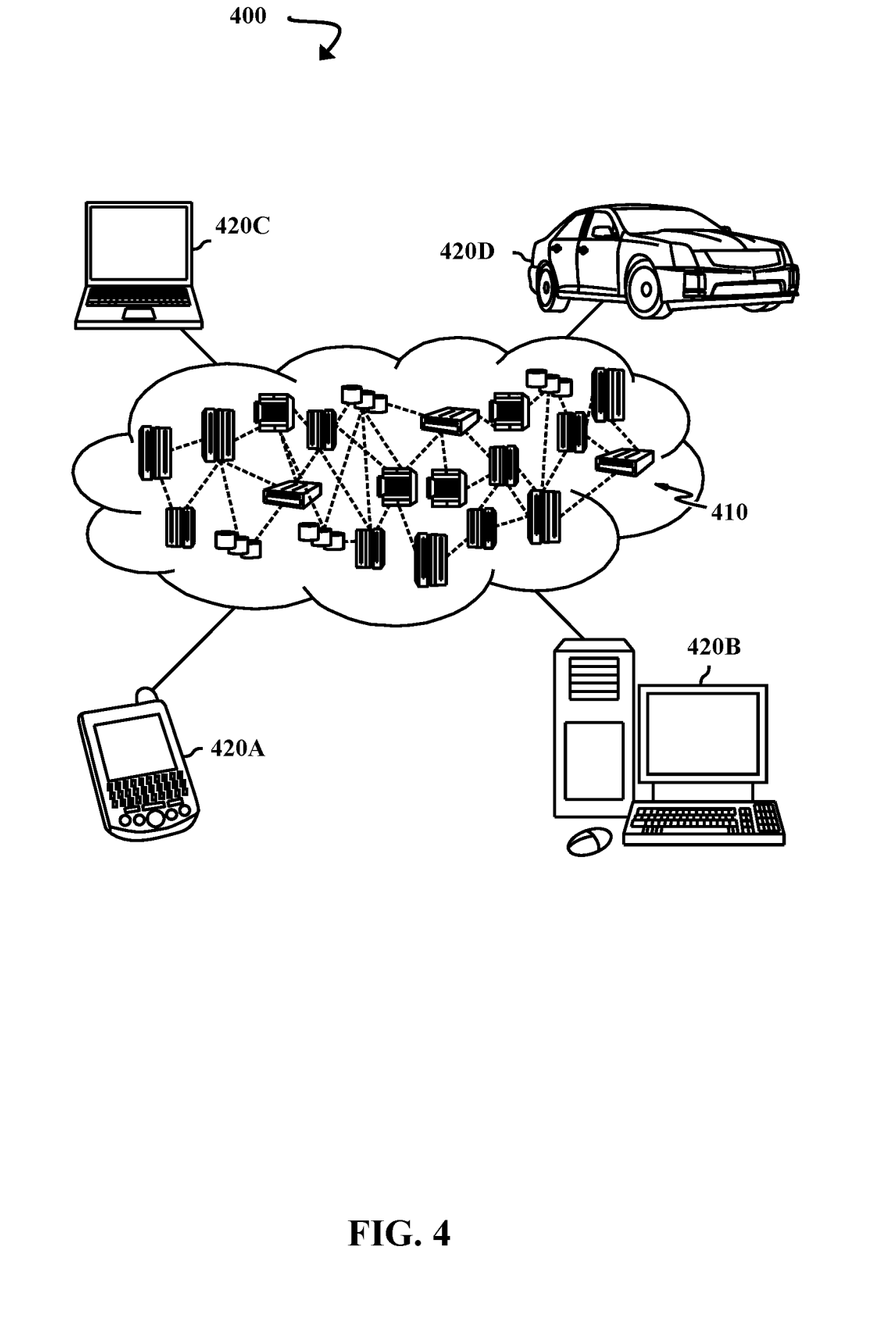
FIG. 4 is a block diagram illustrating a cloud computing environment, according to some embodiments of the present disclosure.

FIG. 4 is a block diagram illustrating a cloud computing environment 400, according to some embodiments of the present disclosure. As shown, cloud computing environment 400 includes one or more cloud computing nodes 410 with which local computing devices used by cloud consumers, such as, for example, personal digital assistant (PDA) or cellular telephone 495A, desktop computer 495B, laptop computer 495C, and/or automobile computer system 495D can communicate. Nodes 411 can communicate with one another. They can be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 495A—495D shown in FIG. 4 are intended to be illustrative only and that computing nodes 411 and cloud computing environment 400 can communicate with any type of computerized device over any type of network and/or network addressable connection (e.g., using a web browser).

Figure 5:
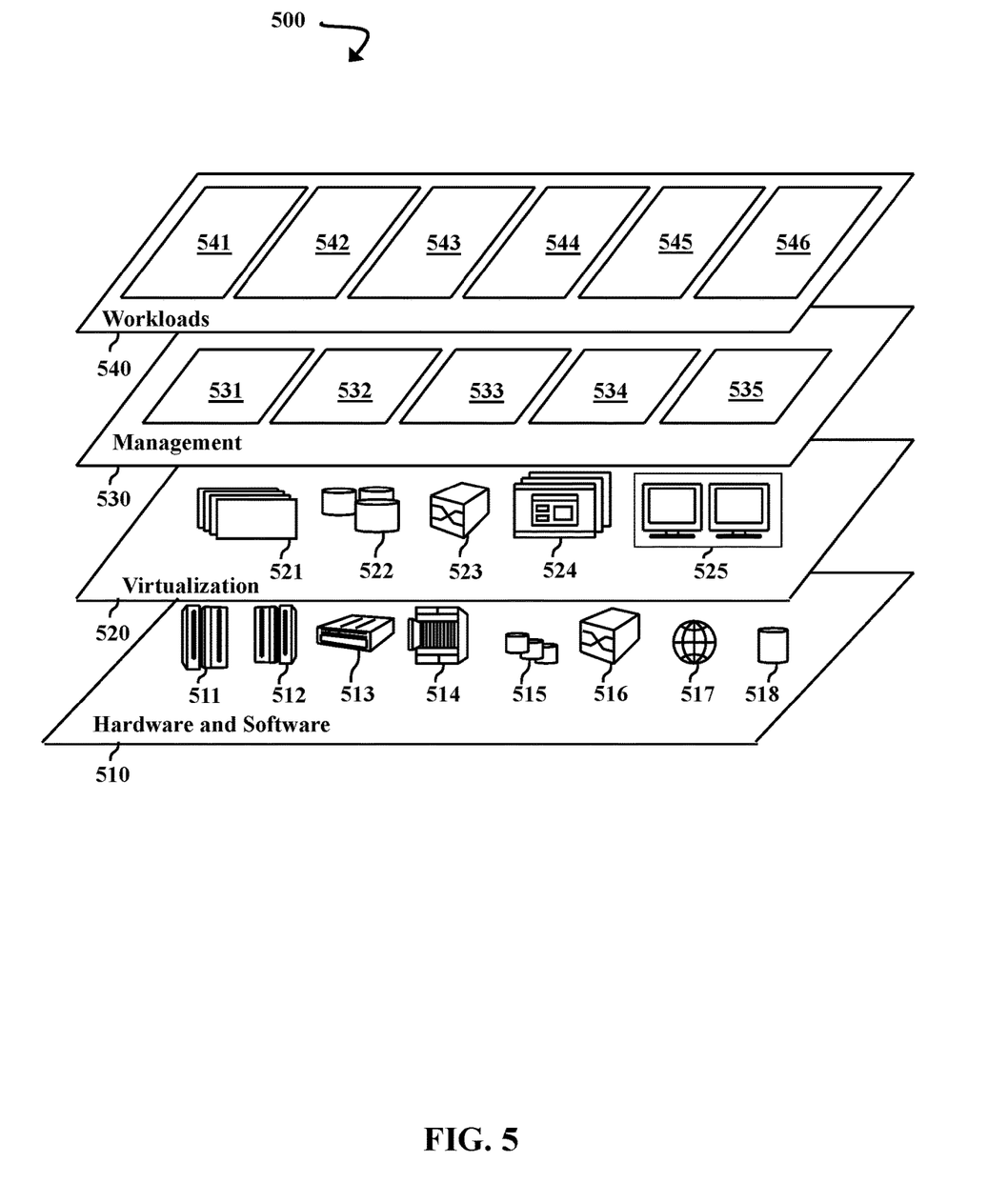
FIG. 5 is a block diagram illustrating a set of functional abstraction model layers provided by the cloud computing environment, according to some embodiments of the present disclosure.

FIG. 5 is a block diagram illustrating a set of functional abstraction model layers 500 provided by the cloud computing environment 400, according to some embodiments of the present disclosure. It should be understood in advance that the components, layers, and functions shown in FIG. 5 are intended to be illustrative only and embodiments of the disclosure are not limited thereto. As depicted, the following layers and corresponding functions are provided: Hardware and software layer 510 includes hardware and software components. Examples of hardware components include: mainframes 511; RISC (Reduced Instruction Set Computer) architecture-based servers 512; servers 513; blade servers 514; storage devices 515; and networks and networking components 516. In some embodiments, software components include network application server software 517 and database software 518.

Virtualization layer 520 provides an abstraction layer from which the following examples of virtual entities can be provided: virtual servers 521; virtual storage 522; virtual networks 523, including virtual private networks; virtual applications and operating systems 524; and virtual clients 525.

In one example, management layer 530 provides the functions described below. Resource provisioning 531 provides dynamic procurement of computing resources and other resources that are utilized to perform tasks within the cloud computing environment. Metering and Pricing 532 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 533 provides access to the cloud computing environment for consumers and system administrators. Service level management 534 provides cloud computing resource allocation and management such that required service levels are met. Service Level Agreement (SLA) planning and fulfillment 535 provide pre-arrangement for, and procurement of, cloud computing resources for which a future requirement is anticipated in accordance with an SLA.

Workloads layer 540 provides examples of functionality for which the cloud computing environment can be utilized. Examples of workloads and functions that can be provided from this layer include: mapping and navigation 541; software development and lifecycle management 542; virtual classroom education delivery 543; data analytics processing 544; transaction processing 545; and function fingerprinting and code ancestry determination 546.

The present disclosure can be a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be accomplished as one step, executed concurrently, substantially concurrently, in a partially or wholly temporally overlapping manner, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof.

In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) can refer to the group of elements as a whole, any subset of the group, or an example specimen of the group.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list might be needed. In other words, "at least one of" means any combination of items and number of items might be used from the list, but not all of the items in the list are required. The item can be a particular object, a thing, or a category.

For example, without limitation, "at least one of item A, item B, and item C" can include item A, item A and item B, or item B. This example also can include item A, item B, and item C or item B and item C. Of course, any combinations of these items can be present. In some illustrative examples, "at least one of" can be, for example, without limitation, two of item A; one of item B; ten of item C; four of item B and seven of item C; or other suitable combinations.

For purposes of this description, certain aspects, advantages, and novel features of the embodiments of this disclosure are described herein. The disclosed methods, and systems should not be construed as being limiting in any way. Instead, the present disclosure is directed toward all novel and nonobvious features and aspects of the various disclosed embodiments, alone and in various combinations and sub-combinations with one another. The methods, and systems are not limited to any specific aspect or feature or combination thereof, nor do the disclosed embodiments require that any one or more specific advantages be present, or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms can vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises."

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system comprising:
   at least one interface configured to receive data from and transmit data to a first computing device of a plurality of computing devices involved in a virtual online meeting shared from a host computing device through an external application;
   a processor communicatively coupled to the at least one interface, wherein the processor is configured to:
      receive, via the at least one interface, a request from a first user of the first computing device of the plurality of computing devices via a voice command of the first user of the request to change a display of a shared content of the virtual online meeting from the host computing device on the first computing device, wherein the voice command includes one or more trigger words of a pre-set historical corpus of trigger words that are configured to cause a correlated action on the first computing device, wherein the first computing device includes a microphone through which the voice command of the request is recorded, and wherein the voice command from the first user of the first computing device is not externally transmitted to other users of the plurality of computing devices; and
      output instructions to a virtual assistant that is communicatively coupled to the first computing device to change the display of the shared content from the host computing device on the first computing; and
   a storage device, including the pre-set historical corpus of trigger words that are configured to change the display on the first computing device, and configured to recognize one or more of the trigger words in the voice command from the first computing device, wherein the pre-set historical corpus of trigger words are prepared from the first user's trained text of intent associated with a given action and/or from an index of spoken content from the first user prepared prior to the virtual online meeting.

2. The system of claim 1, wherein the virtual assistant changes the display of the shared content on the first computing device to zoom in on a portion of the shared content.

3. The system of claim 1, wherein the display of the first computing device is a small screen.

4. The system of claim 1, wherein the virtual assistant is a conversational artificial intelligence (AI)-powered virtual assistant.

5. The system of claim 1,
   wherein the storage device is configured to execute natural language processing of the voice command.

6. A computer-implemented method comprising:
   displaying shared content from a virtual online meeting shared from a host computing device through an external application on a screen of a first computing device of a plurality of computing devices;
   receiving a voice command of a request from a first user from the first computing device, wherein the voice command includes one or more trigger words of a pre-set historical corpus of trigger words that are configured to cause a correlated action on the first computing device, wherein the first computing device includes a microphone through which the voice command of the request is recorded, and wherein the voice command from the first user of the first computing device is not externally transmitted to other users of the plurality of computing devices;
   recognizing the one or more trigger words, in the voice command from the first computing device, of the pre-set historical corpus of trigger words that are configured to change the display on the first computing device, wherein the pre-set historical corpus of trigger words are prepared from the first user's trained text of intent associated with a given action and/or from an index of spoken content from the first user prepared prior to the virtual online meeting to change a display of the shared content from the host computing device on the screen of the first computing device; and
   invoking a virtual assistant to change the display of the shared content from the host computing device on the first computing device as requested in the voice command.

7. The computer-implemented method of claim 6, further comprising:
   changing the display of the shared content on the first computing device to zoom in on a portion of the shared content.

8. The computer-implemented method of claim 6, wherein the first computing device is a smart phone.

9. A method comprising:
   a first user joining a virtual online meeting shared from a host computing device through an external application using a first computing device;
   the first user opting into a virtual assistant software module from the first computing device;
   collecting information from the first user;
   displaying shared content from the virtual online meeting on a screen of the first computing device;
   receiving a voice command of a request from the first user from the first computing device to change a display of the shared content from the host computing device on the screen of the first computing device, wherein the voice command includes one or more trigger words of a pre-set historical corpus of trigger words that are configured to cause a correlated action on the first computing device, wherein the first computing device includes a microphone through which the voice command of the request is recorded, and wherein the voice command from the first user of the first computing device is not externally transmitted to other users of a plurality of computing devices; and
   invoking a virtual assistant to change the display of the shared content from the host computing device on the first computing device as requested in the voice,
   wherein the virtual assistant software module includes the pre-set historical corpus of trigger words that are configured to change the display on the first computing device and configured to recognize one or more of the trigger words in the voice command from the first computing device, wherein the pre-set historical corpus of trigger words are prepared from the first user's trained text of intent associated with a given action and/or from an index of spoken content from the first user prepared prior to the virtual online meeting.

10. The method of claim 9, further comprising:
changing the display of the shared content on the first computing device to zoom in on a portion of the shared content.

11. The method of claim 9, further comprising:
the virtual assistant taking a given action requested by the first user to zoom in on a portion of the shared content on the screen of the first computing device.

12. The method of claim 9, wherein the first computing device is a smart phone.

13. The method of claim 9, wherein the virtual assistant is a conversational artificial intelligence (AI)-powered virtual assistant.

* * * * *